US010946274B2

(12) United States Patent
Miller et al.

(10) Patent No.: US 10,946,274 B2
(45) Date of Patent: Mar. 16, 2021

(54) MULTI-USER GAME SYSTEM WITH TRIGGER-BASED GENERATION OF PROJECTION VIEW

(71) Applicant: SUPER LEAGUE GAMING, INC., Santa Monica, CA (US)

(72) Inventors: John Miller, Pacific Palisades, CA (US); David Steigelfest, Santa Monica, CA (US)

(73) Assignee: SUPER LEAGUE GAMING, INC., Santa Monica, CA (US)

( * ) Notice: Subject to any disclaimer, the term of this patent is extended or adjusted under 35 U.S.C. 154(b) by 0 days.

(21) Appl. No.: 15/179,868

(22) Filed: Jun. 10, 2016

(65) Prior Publication Data
US 2016/0279511 A1 Sep. 29, 2016

Related U.S. Application Data

(63) Continuation of application No. PCT/US2015/029532, filed on May 6, 2015.
(Continued)

(51) Int. Cl.
*A63F 13/26* (2014.01)
*A63F 13/843* (2014.01)
(Continued)

(52) U.S. Cl.
CPC .............. *A63F 13/26* (2014.09); *A63F 13/27* (2014.09); *A63F 13/843* (2014.09); *A63F 13/92* (2014.09)

(58) Field of Classification Search
CPC .......... A63F 13/12; A63F 13/00; A63F 13/26; A63F 13/27; A63F 13/843; A63F 13/92
See application file for complete search history.

(56) References Cited

U.S. PATENT DOCUMENTS 6,056,640 A 5/2000 Schaaij
6,257,982 B1 7/2001 Rider et al.
(Continued)

FOREIGN PATENT DOCUMENTS

WO WO 2020/023403 1/2002
WO WO 2016/073035 5/2016

OTHER PUBLICATIONS

International Search Report and Written Opinion of the International Searching Authority for International Application No. PCT/US2015/029532, dated Jul. 30, 2015, 7 pages.
(Continued)

*Primary Examiner* — Malina D. Blaise
(74) *Attorney, Agent, or Firm* — Polsinelli LLP

(57) ABSTRACT

A game system is disclosed that enables users to play games on their respective devices while viewing associated information on a separate screen, such as that of a movie theater. One of the methods includes maintaining, by a system running a game server associated with an electronic game, communications with one or more user devices each running a game client associated with the electronic game. The communications include client game information from each user device that identifies user interactions with the respective game client. Display data that includes a projection view to be provided for presentation on a display, separate from the user devices, is generated to be viewed by the users of the user devices. The display data is generated by a camera game client, controlled by the system, from a location in a game world of the electronic game. The projection view is presented on the display.

21 Claims, 7 Drawing Sheets

Related U.S. Application Data

(60) Provisional application No. 62/075,357, filed on Nov. 5, 2014.

(51) Int. Cl.
*A63F 13/92* (2014.01)
*A63F 13/27* (2014.01)

(56) References Cited

U.S. PATENT DOCUMENTS

| | | | |
|---|---|---|---|
| 6,346,045 B2 | 2/2002 | Rider et al. | |
| 7,278,920 B1 | 10/2007 | Klamer et al. | |
| 7,445,549 B1 | 11/2008 | Best | |
| 7,938,727 B1 | 5/2011 | Konkle | |
| 8,038,533 B2 | 10/2011 | Tsuchiyama et al. | |
| 8,348,760 B2 | 1/2013 | Mao et al. | |
| 8,475,284 B1* | 7/2013 | Rudi | A63F 13/5258 463/42 |
| 8,556,729 B2 | 10/2013 | Suzuki et al. | |
| 8,632,410 B2 | 1/2014 | Perlman et al. | |
| 8,636,589 B2 | 1/2014 | Harris et al. | |
| 8,795,086 B2* | 8/2014 | Rudi | A63F 13/10 463/4 |
| 8,834,268 B2* | 9/2014 | Kern | A63F 13/86 463/31 |
| 8,864,566 B2 | 10/2014 | Snoddy et al. | |
| 8,874,661 B2* | 10/2014 | Wild | H04L 67/24 463/42 |
| 8,910,309 B2 | 12/2014 | Harrison et al. | |
| 9,067,150 B2 | 6/2015 | Konkle | |
| 9,101,836 B1 | 8/2015 | Brenden et al. | |
| 9,120,019 B2 | 9/2015 | Mescon et al. | |
| 9,174,135 B2* | 11/2015 | Abe | A63F 13/92 |
| 9,369,776 B2* | 6/2016 | Lanier | G06Q 20/102 |
| 9,403,090 B2 | 8/2016 | Harris et al. | |
| 9,526,995 B2* | 12/2016 | Brunstetter | A63F 13/00 |
| 9,687,745 B2 | 6/2017 | Lin et al. | |
| 2002/0098885 A1* | 7/2002 | Sakaguchi | A63F 13/335 463/31 |
| 2002/0165630 A1 | 11/2002 | Arthur et al. | |
| 2003/0107647 A1* | 6/2003 | James | A63F 13/5252 348/116 |
| 2003/0216185 A1 | 11/2003 | Varley | |
| 2004/0224761 A1* | 11/2004 | Nishimura | A63F 13/10 463/33 |
| 2004/0229687 A1* | 11/2004 | Miyamoto | A63F 13/10 463/30 |
| 2005/0014554 A1 | 1/2005 | Walker et al. | |
| 2006/0229122 A1 | 10/2006 | Macke | |
| 2006/0281546 A1* | 12/2006 | Iwamoto | A63F 13/10 463/32 |
| 2007/0037625 A1 | 2/2007 | Edwards | |
| 2007/0099702 A1 | 5/2007 | Tupper | |
| 2007/0117617 A1* | 5/2007 | Spanton | A63F 13/12 463/29 |
| 2007/0270215 A1 | 11/2007 | Miyamoto et al. | |
| 2008/0016176 A1 | 1/2008 | Leitner | |
| 2008/0125226 A1* | 5/2008 | Emmerson | A63F 13/10 463/42 |
| 2008/0262910 A1 | 10/2008 | Altberg et al. | |
| 2008/0263458 A1 | 10/2008 | Altberg et al. | |
| 2008/0318678 A1 | 12/2008 | Stivoric et al. | |
| 2009/0017913 A1 | 1/2009 | Bell et al. | |
| 2009/0118017 A1 | 5/2009 | Perlman et al. | |
| 2009/0131141 A1 | 5/2009 | Walker et al. | |
| 2009/0221367 A1* | 9/2009 | Longley | G07F 17/3276 463/32 |
| 2009/0262112 A1* | 10/2009 | Yoshimura | A63F 13/812 345/427 |
| 2010/0016054 A1 | 1/2010 | Berman et al. | |
| 2010/0020080 A1* | 1/2010 | Iwanaga | G06T 15/60 345/426 |
| 2010/0304869 A1* | 12/2010 | Lee | A63F 13/355 463/42 |
| 2011/0319148 A1 | 12/2011 | Kinnebrew et al. | |
| 2012/0077586 A1* | 3/2012 | Pishevar | A63F 13/06 463/31 |
| 2012/0134651 A1* | 5/2012 | Cottrell | A63F 13/497 386/278 |
| 2012/0299938 A1* | 11/2012 | Iwasaki | A63F 13/12 345/501 |
| 2012/0302341 A1* | 11/2012 | Abe | A63F 13/5255 463/31 |
| 2012/0306856 A1* | 12/2012 | Tada | A63F 13/5255 345/419 |
| 2012/0306857 A1* | 12/2012 | Hayashida | A63F 13/5252 345/419 |
| 2012/0309518 A1* | 12/2012 | Hansen | A63F 13/5255 463/31 |
| 2013/0109468 A1* | 5/2013 | Okamura | A63F 13/577 463/30 |
| 2013/0109470 A1* | 5/2013 | Yamashita | A63F 13/577 463/31 |
| 2013/0109473 A1* | 5/2013 | Yamashita | A63F 13/5252 463/31 |
| 2013/0143669 A1 | 6/2013 | Muller et al. | |
| 2013/0179308 A1 | 7/2013 | Agustin et al. | |
| 2013/0296045 A1 | 11/2013 | Dun et al. | |
| 2014/0018165 A1 | 1/2014 | Kern et al. | |
| 2014/0038708 A1* | 2/2014 | Davison | A63F 13/5252 463/31 |
| 2014/0113718 A1* | 4/2014 | Norman | A63F 13/12 463/31 |
| 2014/0243082 A1 | 8/2014 | Harris et al. | |
| 2014/0248963 A1 | 9/2014 | Tulleken | |
| 2014/0274297 A1* | 9/2014 | Lewis | A63F 13/00 463/20 |
| 2014/0274379 A1 | 9/2014 | Justice et al. | |
| 2016/0166926 A1 | 6/2016 | Hussman et al. | |
| 2016/0279509 A1 | 9/2016 | Miller | |
| 2016/0345035 A1* | 11/2016 | Han | H04N 21/23424 |
| 2017/0087464 A1 | 3/2017 | Perry et al. | |
| 2018/0167656 A1 | 6/2018 | Ortiz et al. | |
| 2019/0336867 A1 | 11/2019 | Verma et al. | |
| 2020/0030697 A1 | 1/2020 | Mueller et al. | |
| 2020/0066093 A1 | 2/2020 | Schwartz | |

OTHER PUBLICATIONS

U.S. Appl. No. 15/179,878 Final Office Action dated Jul. 27, 2018.
U.S. Appl. No. 15/179,878 Office Action dated Feb. 23, 2018.
U.S. Appl. No. 15/179,878 Final Office Action dated Apr. 10, 2017.
U.S. Appl. No. 16/250,843, Aaron Mueller, Cloud-Based Game Streaming, filed Jan. 17, 2019.
PCT/US19/42859, Cloud-Based Game Streaming, Jul. 22, 2019.
U.S. Appl. No. 15/179,878 Final Office Action dated May 30, 2019.
PCT Application No. PCT/US2019/042859 International Search Report and Written Opinion dated Nov. 27, 2019.
U.S. Appl. No. 15/179,878 Office Action dated Nov. 1, 2019.
"League of Legends—Spectator Mode"—https://www.youtube.com/watch?v=oqT14k6BsC0, Apr. 27, 2012.
U.S. Appl. No. 15/179,878 Office Action dated Dec. 18, 2018.

* cited by examiner

MULTI-USER GAME SYSTEM WITH TRIGGER-BASED GENERATION OF PROJECTION VIEW

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Electronic games can be run on user deices, e.g., game consoles, computers, mobile devices, and played by users of the user devices. To play an electronic game, users can provide input to the game using peripherals connected to the user devices, e.g., keyboards, mice, and controllers. Particular electronic games can allow for multiplayer gameplay, that is, two or more players can sit in front of a user device and control separate characters. Several types of multiplayer games, including fighting games, first person shooting games, and racing games, are well known.

In addition to multiplayer gameplay predicated on users being physically near a single user device, some multiplayer games can be played using a network, e.g., a local area network, the Internet, allowing for each user to use distinct user devices separated at an arbitrary distance. The user devices can provide information to each other identifying game related information, e.g., character position, character status, and so on. Alternatively, in some implementations each user device can communicate with a game server controlled by a third party, e.g., the game publisher, that maintains the game related information.

SUMMARY

In general, one innovative aspect of the subject matter described in this specification can be embodied in methods, systems, and computer program products, that include the actions of maintaining, by a system running a game server associated with an electronic game, communications with one or more user devices each running a game client associated with the electronic game, wherein the communications comprise client game information from each user device that identifies, at least, user interactions with the respective game client; determining, using the client game information, that a trigger of a plurality of triggers is satisfied, wherein the trigger identifies particular game events predicted to be of interest or use to the users; generating, using the trigger, display data comprising a projection view to be provided for presentation on a display, separate from the user devices, for viewing by the users of the one or more user devices; and providing the projection view for presentation on the display.

Additionally, the methods, systems, and computer program products, can include the following zero or more actions. A particular trigger is a proximity trigger, and wherein determining that the particular trigger is satisfied comprises determining that one or more user-controlled characters are within a threshold proximity of one or more items, goals, or locations. A particular trigger is an action trigger, and wherein determining that the particular trigger is satisfied comprises determining that one or more user-controlled characters are performing one or more particular actions. A particular trigger is an aggregation trigger, and wherein determining that the particular trigger is satisfied comprises determining that a first threshold number of user-controlled characters are within a second threshold proximity of each other. Generating the projection view comprises: maintaining, by the game server, communications with a camera game client; and obtaining, by the system, the projection view from display data generated by the camera game client from a location in a game world of the electronic game associated with the trigger. The actions include executing, by the system, the camera game client in a virtual machine. Obtaining the projection from view from display data comprises: providing, by the game server, information identifying the location to the camera game client, wherein the camera game client is to place a camera character associated with the camera game client at the location; and obtaining, from display data generated by the camera game client, the projection view.

Particular embodiments of the subject matter described in this specification can be implemented so as to realize one or more of the following advantages. A system can enable a large number of players to play an electronic game, e.g., through interactions with user devices, in a large auditorium, e.g., a movie theater. The system can utilize a large display, e.g., a movie theater screen, to display unique generated views of the game which players would not otherwise be able to view while playing. For instance, in a game that provides a first person view to each player, the large display can show a map with a location of each player's character, or several players engaged in an activity, e.g., shooting or battling each other. Due to the described system, players can now play multiplayer games in a large setting, while sharing in a unique system created view of the game action.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF SPECIFIC EMBODIMENTS

This specification describes a game system configured to provide multiplayer gaming experiences to users in one or more spaces, e.g., a movie theater. The game system maintains communications with user devices operated by the users, allowing the users to play a multiplayer electronic game, e.g., video game, in the space.

The game system provides display data to a display, e.g., a movie theater screen, viewable by each user and distinct from their user devices, that identifies, or directly illustrates, game events occurring, or that have occurred, in the multiplayer game. For example, if the users are playing a multiplayer first person video game, the game system can provide display data, e.g., a video stream, of game events occurring in the multiplayer game, including two or more users engaged in fighting, a user approaching an important item in the game, and so on. In another example, if the users are playing a racing game, the game system can provide a representation of the racing course with continuously updated locations of each user's character on the representation. The display data provided to the display is a projection view, and is described in detail below. In this specification, a game event is anything that occurs, or exists, in the electronic game, which changes, affects, or otherwise modifies, a game state or status of the electronic game. Game events can include a status or attribute of a character (e.g., character's health, experience points, items), items in the electronic game, goals achieved by characters, information describing actions of characters (e.g., location, movement), scores associated with characters, and so on.

Figure 1:
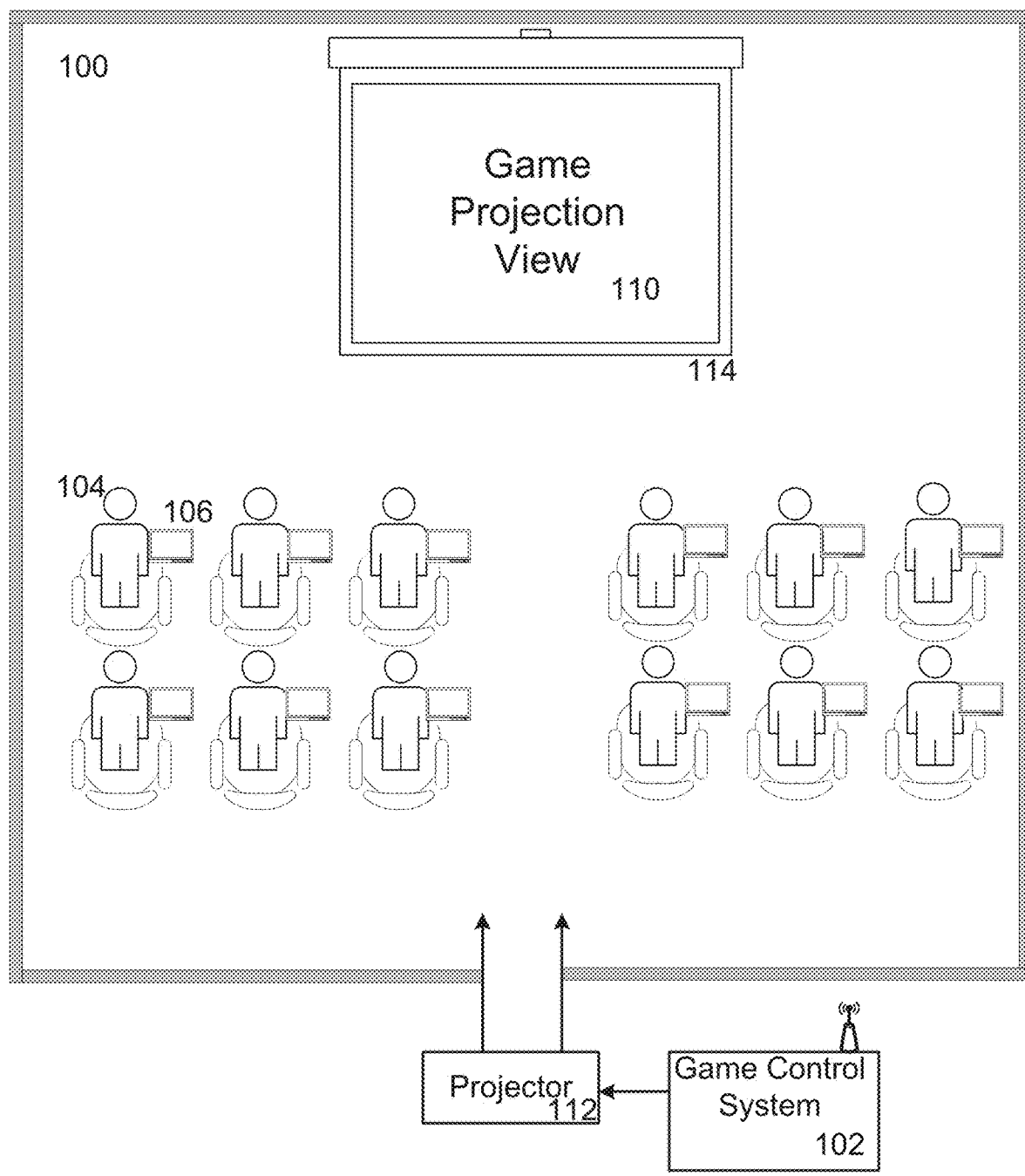
FIG. 1 illustrates a space displaying a game projection view generated by a game control system.

FIG. 1 illustrates a space 100, e.g., a movie theater, displaying a game projection view 110 generated by a game control system 102 in communication with user devices 106. The space 100 includes users 104 interacting with respective user devices 106, e.g., laptops, tablets, mobile devices, to play a multiplayer game.

Each user device runs, e.g., executes, a game client associated with the multiplayer game configured to display a game user interface to a user of the user device, and receive user interactions, e.g., keyboard presses, controller presses, mouse movements, voice input, touch screen interactions, and so on. The game clients provide client game information, e.g., information identifying user interactions, to the game control system 102 which runs a game server associated with the multiplayer game. The game server processes the client game information to determine a status of each user-controlled character, e.g., health, items associated with the character, and positions of each character in the game. In this way, the game server maintains a gameplay experience consistent among each game client.

The space 100 includes a display 114 configured in the space 100 to be viewable by each user. In some implementations, the display 114 is a movie theater projection screen, which displays video received from a projector 112. As illustrated in FIG. 1, the display 114 is displaying a game projection view 110 generated by the game control system 112.

A game projection view 110 is a view associated with a game that is provided to a display viewable by each user, which is distinct from a game view seen by any single user on his/her user device. In some implementations, the game control system 102 generates game projection views to provide to the display 114 based on one or more triggers that identify game events predicted to be of interest or use to users 104. For instance, triggers can include proximity triggers, e.g., triggers that are satisfied when one or more user-controlled characters get close to an object, goal, or other location (e.g., identified as important), action triggers, e.g., triggers that are satisfied when one or more user-controlled characters perform particular actions in the game world, and aggregation triggers, e.g., triggers that are satisfied when more than a threshold number of user-controlled characters are within a threshold proximity of each other. Generating a game projection view 110 is described below, with reference to FIG. 5, For example, the users 104 can be engaged in a first person multiplayer game with each user viewing a first person view of the character he/she controls on his/her user device. The game control system 102 can generate a game projection view 110 upon determining that a trigger identifying whether two or more characters are engaged in a particular activity, e.g., battling, fighting, is satisfied. The game control system 102 can then obtain a view of the activity, and provide the view as the game projection view 110.

To obtain a view of the activity in the first person multiplayer game, the game control system 102 can create a game client controlled by the game control system 102, and include the character associated with the created game client in the multiplayer game. The game control system 102 can then control movement and location of the character, and provide the game projection view 110 as the display data generated by the created game client, e.g., a view seen by the created character. In this way, the created character can act as a camera for the users 104 in the space 100. For instance, the created character can be moved around to locations in the game world to view specific game events that satisfy one or more triggers. To effect this character movement, the game control system 102 can modify attributes of the created character, including making the character invisible to users 104, allowing the character to teleport to particular locations in the game world, and so on. Generating a game projection view 110 with a controlled character is described below, with reference to FIG. 6.

Similarly, in some implementations the game projection view 110 can provide useful information to the users 104. For example, the game projection view 110 can include a representation of a game map of the multiplayer game with locations of each user's character, e.g., the bicycling game described below in FIG. 2.

Figure 2:
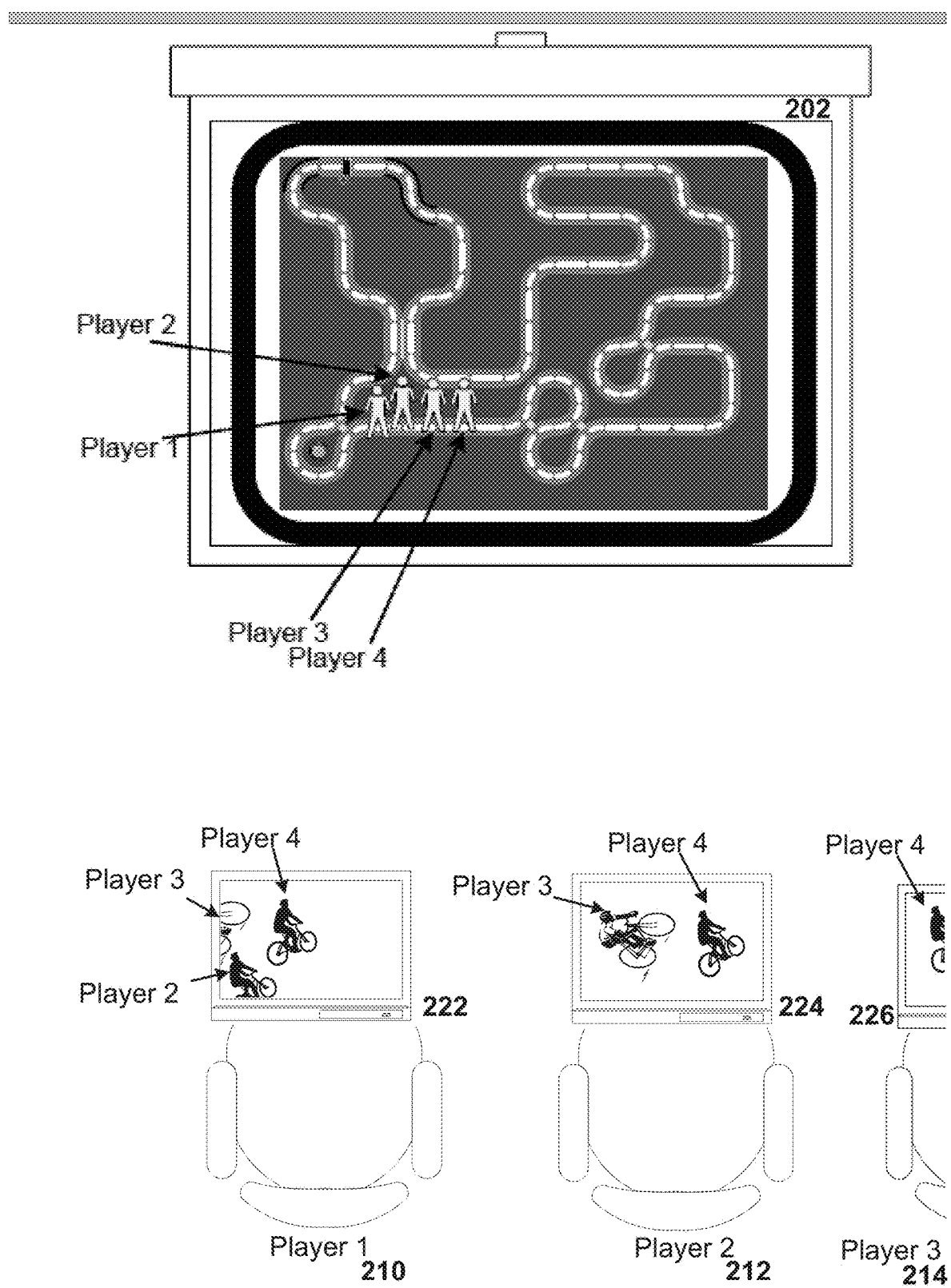
FIG. 2 illustrates an example of a game projection view.

FIG. 2 illustrates an example of a game projection view 202. In the example of FIG. 2, four players are playing a bicycling game on their respective user devices, e.g., user devices 222, 224, and 226 are shown. The illustration includes a zoomed view of two of the players', e.g., player 1 210 and player 2 212, seats and a partial view of a third player's, e.g., player 3 214, seat.

Each user device displays a first person view of a user-controlled character. For instance, player 1's user device 222 is displaying three characters controlled by other users, e.g., player 2, player 3, and player 4. Since player 2's character is ahead of player 1's character, as illustrated on the display of user device 222, player 2's user device 224 excludes display of player 1's character, and displays the remaining two characters ahead of player 2's character, e.g., characters controlled by player 3 and player 4.

The projection view 202 is displaying a map of a bicycling course, with locations of each user's character displayed on the map. In this way each user can quickly identify their rank and location in the larger map.

The projection view 202 advantageously provides for a useful and alternative view to views displayed on each player's user device. As will be described below, the game control system 102 generates the projection view 202 based off determining whether one or more triggers are satisfied. In this example, a trigger can be satisfied upon movement of a player-controlled character, allowing the game control system 102 to update the projection view 202, e.g., the map, with new player controlled character locations.

Figure 3:
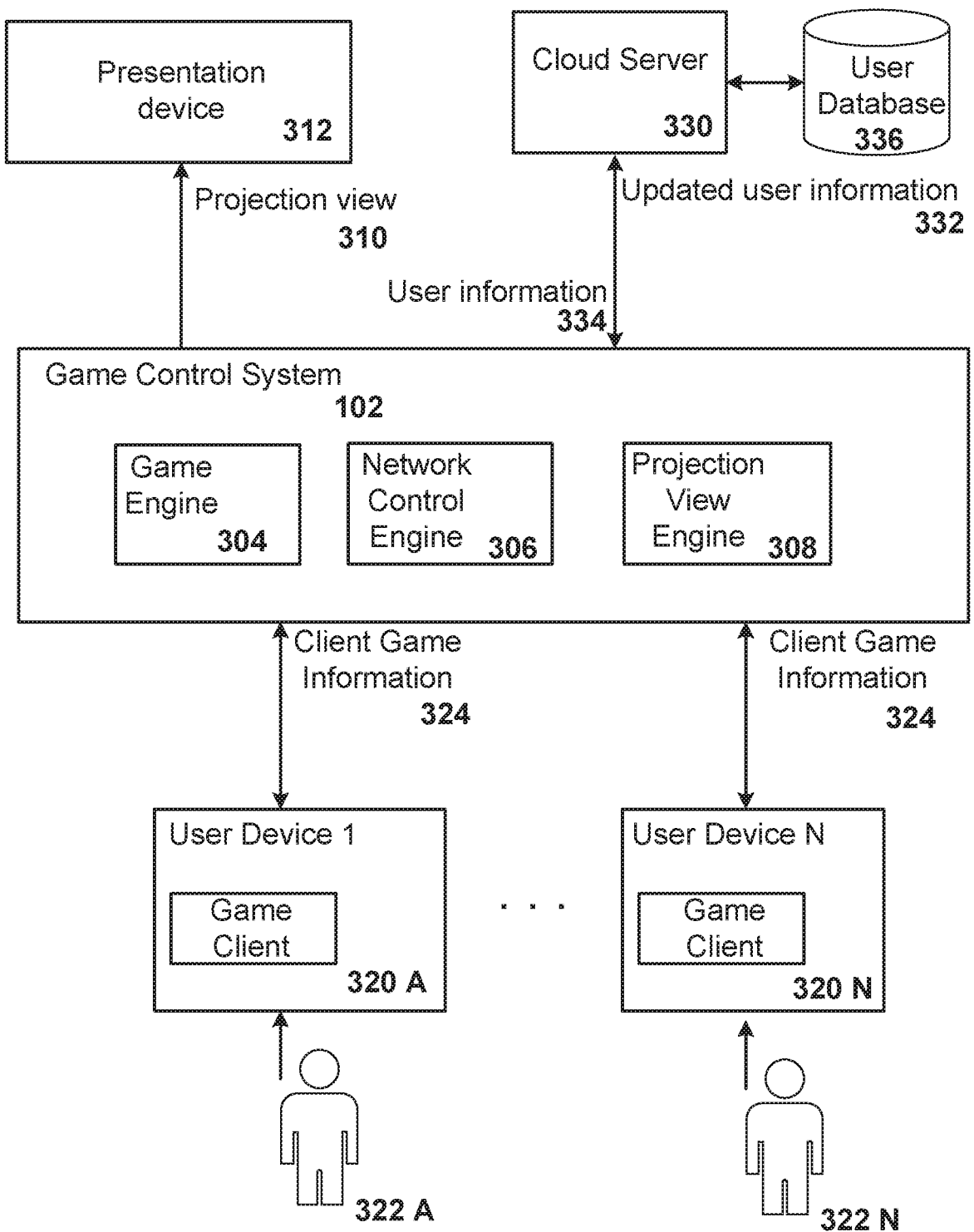
FIG. 3 illustrates a block diagram of a game control system.

FIG. 3 illustrates a block diagram of an example game control system 102. The game control system 102 can be a system of one or more computers, or one or more virtual machines executing on a system of one or more computers. The game control system 102 is in communication with user devices, e.g., user devices 320A-N, and provides a projection view 310 for presentation on a presentation device 312 to users 322A-N of the user devices 320A-N. Additionally, in some implementations the game control system 102 can be in communication with a cloud server 330, e.g., a server that stores user information 334 associated with the users 322A-N.

The game control system 102 includes a network control engine 306 that can maintain communications between the game control system 102, user devices 320A-N, and the cloud server 330 over one or more networks, e.g., a LAN, a WAN, the Internet. In some implementations, the network control engine 306 can be configured as a Dynamic Host Configuration Protocol server (DHCP server) that receives game connection requests from user the devices 320A-N and associates the user devices 320A-N with the game control system 102. The network control engine 306 can communicate with the user devices 320A-N through a wired connection, e.g., using Ethernet, or through a wireless connection.

Upon entrance of a space, e.g., the movie theater described in FIG. 1, users 322A-N can provide connection requests to the network control engine 306, e.g., by joining a wireless access point in communication with, or controlled by, the network control engine 306. In some implementations, one or more users can provide a connection request to the network control engine 306 over the Internet, and not be present in the space. That is, users situated outside of the space can play the multiplayer game as if they were located in the space. In some implementations, the system can highlight, or otherwise identify, users not located in the space. The network control engine 306 can then prompt each user to enter login information, e.g., a user name and password associated with the user. In some implementations, after receiving login information, the network control engine 306 can authenticate each user to determine whether they are permitted to play the multiplayer game. To authenticate each user, the network control engine 306 can obtain user information 334, e.g., from the cloud server 330, and identify whether the user has performed an action required to play the multiplayer game. The network control engine 306 can prompt users that are not permitted to play, to perform the action.

After authentication by the network control engine 306, the game control system 102 can obtain, e.g., from the cloud server 330, user information 334 associated with the users 322A-N, e.g., scores associated with respective users or user-controlled characters, rankings of users and respective multiplayer games, teams each user is a member of, and so on. This user information 334 can be stored by the game control system 102, and after completion of the multiplayer game, any updates to user information 332, e.g., an updated score, an update to team membership, can be provided to the cloud server 330 for storage in a user database 336, e.g., one or more databases, one or more storage systems or subsystems.

The cloud server 330 can host, or provide information to another system that hosts, a resource, e.g., a website, that identifies particular user information 334, e.g., the resource can display user profiles of users 322A-N identifying user scores, multiplayer games each user has played, and so on. The resource can be accessible by users, e.g., the website can require a login name and password, or the resource can be accessible to the public. Updated user information 332 can be provided to the cloud server 330 to be displayed on the resource. In some implementations, the updated user information 332 can be included in a particular data format generated by the game control system 102, e.g., the game control system 102 can generate an extensible language markup (XML) document that includes the updated user information 332.

Additionally, in some implementations, the cloud server 330 can receive screenshots, or video, e.g., user gameplay generated by a user device, or a projection view 310. These screenshots, or video, can be displayed on the resource, or they can be provided to social networks associated with respective users who provided the screenshots, or video. The cloud server 330 can also maintain leaderboards identifying rankings of users with respect to one or more multiplayer games, which can be updated in real-time, e.g., as the users 322A-N are playing the multiplayer game, based on updated user information 332 received, by the cloud server 330, during gameplay. Maintaining leaderboards is described below, with reference to step 710 of FIG. 7.

The game control system 102 includes a game engine 304 configured as a game server associated with the multiplayer game being played by the users 322A-N. The game engine 304 can receive communications from game clients running on the user devices 320A-N through a network, e.g., a local area network (LAN), a wide area network (WAN), the Internet, and is configured as the authoritative source of game events in the multiplayer game. For instance, the game engine 304 can maintain a status of characters in the game, locations of the characters in the game world, goals achieved by characters, items obtained by characters, and so on.

The game engine 304 can receive client game information 324 identifying user interactions with each user device from game clients running on the user devices 320A-N. User interactions can include pressing of particular keys on a keyboard, mouse movements, inputs on a controller, interacting with a touchscreen, voice input, and so on. The game engine 304 can process the client game information 324 to determine updates to game events, including the health of characters, position of characters, a score associated with the characters, and so on. After processing, the game engine 304 can provide the updates back to the game clients running on the user devices 320A-N. In this way, the game engine 304 maintains a consistent game environment for users 320A-N playing the multiplayer game.

The game control system 102 further includes a projection view engine 308 that can generate a projection view 310 to be provided for presentation to the presentation device 312, e.g., a movie theater screen.

The projection view engine 308 can generate the projection view 310 by determining whether one or more triggers are satisfied, and generate a view associated with the satisfied triggers. As described above, a trigger identifies game events predicted to be of interest or use to users. Different triggers can be associated with different multiplayer games, and in some implementations, the projection view engine 308 can be specific to one or more multiplayer games.

In a first example, in particular games, e.g., first or third person games with a three-dimensional user perspective, triggers can identify game events associated with particular user actions, e.g., users engaged in fighting, users cooperating to complete a game task. Additionally, triggers can identify important items or goals in a game, and can be satisfied when one or more users are within a certain distance of the item or goal. A trigger can also be satisfied when a particular number of users, e.g., 2, 3, 10, are located within a threshold proximity of each other. Similarly, a trigger can be satisfied by determining that a user has obtained a top user score, or a first place position, e.g., in a racing game.

In the first example, the projection view engine 308 can generate the projection view 310 by running a game client, and including a character, controlled by the projection view engine 308, in the multiplayer game. The controlled character can be configured as a camera, operable to be moved around to different locations in a game world, e.g., the multi-dimensional game map created by the multiplayer game which characters can move around in, to obtain views associated with a satisfied trigger. For instance, if the projection view engine 308 determines that a trigger associated with two users engaged in battle is satisfied, the projection view engine 308 can move the controlled character proximate to a location of the battle. The projection view 310 can then be generated from display data generated by the controlled game client, e.g., a view that a user would see if he/she were controlling the character. In another instance, if the projection view engine 308 determines that a trigger associated with a user achieving a first place position, e.g., in a racing game, or achieving a top user score, the projection view engine 308 can provide a projection view 310 associated with the trigger, e.g., a view illustrating the user-controlled character in the racing game.

To run a game client, the projection view engine 308 can execute a virtual machine on the game control system 102, and run the game client in the virtual machine. The game client can then communicate with the game engine 304 over a network, e.g., a virtual connection to the network control engine 306. In some implementations, the game engine 304 can recognize the created game client, and imbue unique attributes to the controlled character. For instance, the character can possess the ability to fly, the ability to teleport to particular locations in the game world, and the ability to be invisible and invulnerable. Additionally, the game client can be modified to remove messages or status information that would ordinarily be displayed to a user, e.g., a health level of the character, and so on. In this way, the projection view engine 308 can utilize the display data generated by the game client as a camera into the game world, e.g., a first person view of the character controlled by the projection view engine 308. Generating a projection view with a controlled character is described below, with reference to FIG. 6.

In a second example, in particular games, e.g., strategy games, triggers can be satisfied by particular game events identifying selections of character attributes or items by users, or a team of users, during a specific time period, e.g., an initial time period during which users make selections to their respective characters. The projection view engine 308 can store information identifying the selections, and generate a projection view 310 that identifies the selections. The projection view 310 can be provided at a later time-period, e.g., a time-period when users, or a team of users, are engaged in the game against other users, or another team of users.

In a third example, in particular multiplayer games, e.g., the bicycling game described above in FIG. 2, or any multiplayer game with a game map characters move around in, the projection view 310 can include a game map with locations of user-controlled characters. The projection view engine 308 can update the locations of characters based on determining whether a trigger associated with character movement is satisfied.

The description above has described the game control system 102 as being associated with users 322A-N playing a single multiplayer game. In some implementations a single game control system 102 can run and control 10, 50, 100, different multiplayer games with respective users in respective spaces playing the games. For instance, the game control system 102 can execute one or more virtual machines for each multiplayer game that implement the above-described functionality.

Additionally, the game control system 102 can create a multiplayer team-based game experience, with a virtual machine implementing the functionality above for each single team-based game match. Multiple teams can thus compete against each other at the same time, with each game match played using a respective virtual machine. Creating a multiplayer team-based game experience is described below, with reference to FIG. 7.

Figure 4:
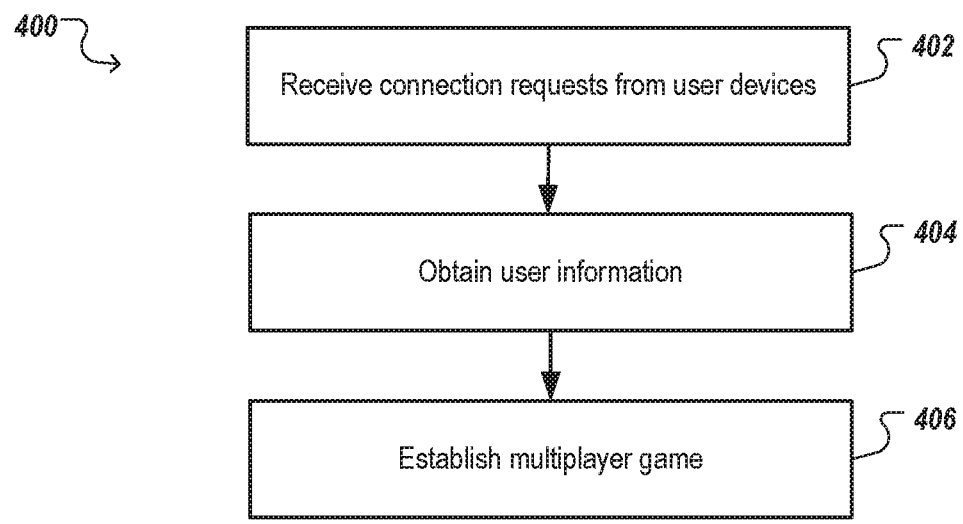
FIG. 4 is a flowchart of an example process for initiating a multiplayer game experience with users.

FIG. 4 is a flowchart of an example process for initiating a multiplayer game experience with users. For convenience, the process 400 will be described as being performed by a system of one or more computers, e.g., the game control system 102.

The system receives connection requests from user devices (block 402). As illustrated in FIG. 1, users can enter a space, e.g., a movie theater, and run game clients on user devices associated with a particular multiplayer game. The user devices connect to a network, e.g., a wireless network, that is controlled by, or in communication with, the system running a game server associated with the multiplayer game. The system therefore receives connection requests to join the multiplayer game from each of the game clients, and establishes communications with each user device.

In some implementations, a user device can connect to the system over a different network, e.g., the Internet. The user device can run a game server associated with the multiplayer game, and provide a connection request to the system to engage in gameplay with the users in the space.

The system obtains user information (block 404). The system can receive, e.g., with the connection request, information identifying each user, including a user name associated with the user. In some implementations, the system can provide a prompt to the user devices identifying that each user should enter in a username and/or a password associated with the user. The system can then access stored user information, e.g., stored on a cloud server in communication with the system, and obtain user information associated with the particular user. User information can include experience points associated with the multiplayer game, a user score, rankings on leaderboards associated with the multiplayer game, and information identifying one or more teams that include the user. Additionally, as described above in FIG. 3, the system can authenticate each user to determine whether he/she is permitted to play the multiplayer game.

After the multiplayer game has ended, the system updates the user information, e.g., an updated user score, or an updated ranking on a leaderboard, and provides the updates for storage on the cloud server. In this way, the user can persist one or more characters beyond a single multiplayer gaming experience, and users can battle for higher user scores, or higher rankings on leaderboards, through multiple multiplayer gaming experiences. Updating user information is described below, with reference to step 710 of FIG. 7.

In some implementations, prior to entering the space, e.g., a movie theater, users can provide user information, e.g., to the cloud server, identifying one or more teams they are a member of, including multiplayer games associated with each team. The system can then obtain information identifying the teams, and if the multiplayer game is team based, automatically assign users to their respective teams during gameplay. Additionally, the system can automatically match teams together to play against each other, and determine new team matches based off the outcomes of prior matches. Generating a team-based multiplayer game experience is described below, with reference to FIG. 7.

The system establishes a multiplayer game (block 406). The system provides information to the game server running on the system to begin the multiplayer game. After establishing the multiplayer game, the system receives user interactions with respective game clients, e.g., keyboard presses, touchscreen interactions, and updates game events, e.g., locations of user-controlled characters, items obtained by characters, goals achieved, and so on, to provide back to the game clients. In this way, the system ensures a common gameplay experience among the users.

For instance, in a first person game a user can press a particular key associated with moving his/her character forward. The system can receive the user interaction, e.g., that the particular key was pressed, and update a game event, e.g., an updated location of the user-controlled character. The system can then provide this updated location to the game clients, ensuring each game client receives the same updated location.

As described below, the system generates a game projection view to provide to a display viewable by each user.

Figure 5:
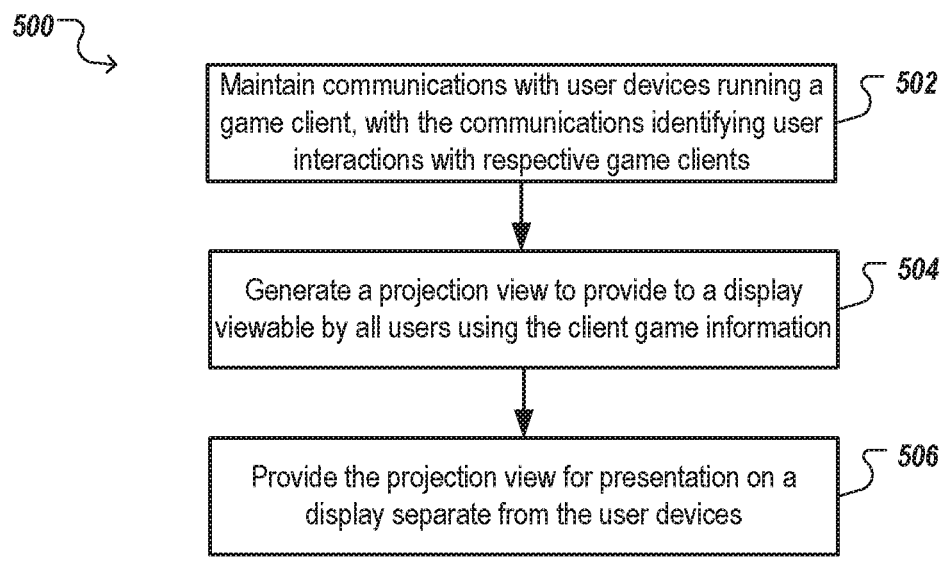
FIG. 5 is a flowchart of an example process for generating a game projection view.

FIG. 5 is a flowchart of an example process for generating a game projection view. For convenience, the process 500 will be described as being performed by a system of one or more computers, e.g., the game control system 102.

The system maintains communications with user devices running respective game clients (block 502). As described above, users of user devices, e.g., laptops, mobile devices, tablets, consoles, can enter a space, e.g., a movie theater as described in FIG. 1, and run game clients on their user devices associated with a particular multiplayer game. The system runs a game server associated with the multiplayer game, and receives client game information from user devices identifying user interactions with their respective game clients. The system maintains the communications with the user devices, allowing the users to engage in the multiplayer game.

The system generates a projection view to provide to a display viewable by all users of a particular multiplayer game match, using the client game information (block 504). As described in FIG. 1, a display, e.g., a movie theater screen, is configured to be viewable by each user engaged in the multiplayer game. The system utilizes the display to provide a projection view distinct from any single view displayed on a user's user device.

To generate the projection view, the system determines whether a trigger identifying particular game events has been satisfied. Game events can include the occurrence of particular items, a health amount associated with user-controlled characters, user scores, locations and proximities of user-controlled characters to particular items, movement of characters or non-playable characters in the multiplayer game, multiplayer game goals achieved, locations and proximities of user-controlled characters to other user-controlled characters, and actions of user-controlled characters taken toward other user-controlled characters.

Particular games might only be suitable for particular triggers, e.g., a puzzle game might not be suitable for a trigger identifying two characters engaged in battle. In some implementations, the system stores information identifying triggers and associated multiplayer games. In some other implementations, the game server associated with particular multiplayer games can be modified to include reference to specific triggers.

The system determines whether triggers associated with the particular multiplayer game are satisfied upon the occurrence of any new, or updated, game event, or at specific time intervals, e.g., 100 ms, 1 second, or 5 seconds. Since multiple triggers might be satisfied during a specific time interval, the system can obtain information identifying a hierarchy of triggers, and select a particular trigger. That is, if the system determines that 5 triggers are satisfied in a 5 second time period, the system can generate a projection view associated with only the trigger identified as highest in the hierarchy. Alternatively, the system can determine whether a projection view associated with a particular satisfied trigger has been generated in a previous time-period, e.g., 2 minutes, 5 minutes, and upon a positive determination, generate a projection view associated with a different trigger. In this way, the system can provide projection views that vary, keeping the projection views interesting for users.

As an example, a trigger can be satisfied when two or more user-controlled characters are engaged in a battle. The system can identify the battle by identifying game events indicative of a battle, e.g., a first character is swinging a weapon and making contact with a second user-controlled character. Additionally, some multiplayer games might store a game event identifying that user-controlled characters are engaged in a battle. The system can then obtain the game event, and determine that the trigger is satisfied.

After determining that a trigger is satisfied, the system generates a projection view associated with the trigger. In the above example, the system can obtain a view that would be seen by a character configured in a position to watch the battle. To obtain such a view, the system can run a game client controlled by the system, and control a character configured as a camera into the game world. The system can position the controlled character to obtain a view associated with the trigger, e.g., the battle, and obtain display data generated by the game client to provide as the projection view. Generating a projection view using a system-controlled character is described below, with reference to FIG. 6.

Additionally, the system can generate a projection view of one or more of the user-controlled character's view, e.g., a first-person view, as it is engaged in battle. In some implementations, the system can provide the first-person view's of two user-controlled characters engaged in battle as the projection view, enabling all users to view the battle in a first-person view.

In another example, a trigger can be satisfied upon any updates to locations of user-controlled characters. For instance, in a racing game, e.g., the bicycling game described above in FIG. 2, the system can obtain information identifying a game world, e.g., a bitmap file that includes the game world, and locations of user-controlled characters, e.g., from game events identifying the locations. The system can determine whether any user-controlled character has moved, e.g., from game events identifying locations of the characters. Upon a positive determination, the system can generate display data that includes the game world, and updated locations of user-controlled characters.

In another example, a trigger can be satisfied upon any updates to user scores, e.g., a number of points associated with the multiplayer game, or user rankings. For instance, a particular user-controlled character can obtain a particular item, which in the multiplayer game is associated with a number of points. The system can obtain a game event identifying the updated number of points, and generate a projection view associated with the trigger. The projection view can include an identifier of each user playing the multiplayer game, and their respective user score, or user ranking. The updated ranking determined from the satisfaction of the trigger can be provided as the projection view. In this way, the users playing the multiplayer game can be aware of their user score or user ranking.

The system provides the projection view for presentation on a display separate from the user devices (block 506). After generating the projection view, the system can provide the projection view to the users engaged in the multiplayer game. In some implementations, the system provides the projection view to a projection device, e.g., over a wired or wireless connection, which then projects the projection view to a display viewable by the users.

Once the system provides the projection view, in some implementations the system will continue to provide the projection view, and any updates to the projection view, for a particular period of time, or until the trigger is no longer satisfied, before altering the projection view.

For instance, the system can provide a projection view of two users engaged in battle, and continue to provide the projection view for a time period, or until determining that the trigger is no longer satisfied, e.g., a player loses the battle. Similarly, for a racing multiplayer game, the system can provide a representation of the game map, e.g., the racecourse, and identifiers of user-controlled characters at their respective locations in the game map as the projection view. The system can continue to provide the projection view that includes the game map, with updates to locations of user-controlled characters, by determining updates to a trigger identifying that user-controlled characters have moved.

In some implementations, the system can generate more than one projection view for presentation on a display, e.g., a movie theater screen as described in FIG. 1. That is, the system can determine that more than one trigger is satisfied, and generate respective projection views associated with the triggers. These projection views can be simultaneously provided to the display, e.g., two projection views can be provided on respective halves of the display. As described below, the system can generate projection views using a system-controlled game client. With more than one projection view, the system can create two system-controlled game clients, and generate projection views using two system-controlled characters.

Additionally, in some implementations the system can provide information to particular user devices associated with user-controlled characters identified in the projection view. The particular user devices can then display an indicator, to each respective user, identifying that the user's respective user-controlled character is included in the projection view. The indicator can include highlighting each user's character, e.g., shading the user-controlled character, placing a halo around the user-controlled character, and so on. Additionally a particular sound can be played through the particular user devices, or text can be displayed on the particular user devices, e.g., "Look up!", "Your Character is on screen", and so on. In some implementations, the system can automatically include, in the projection view, identifying information of the user-controlled characters included in the projection view, e.g., the system can include text or other identification information in the projection view, for instance above each user-controlled character.

Figure 6:
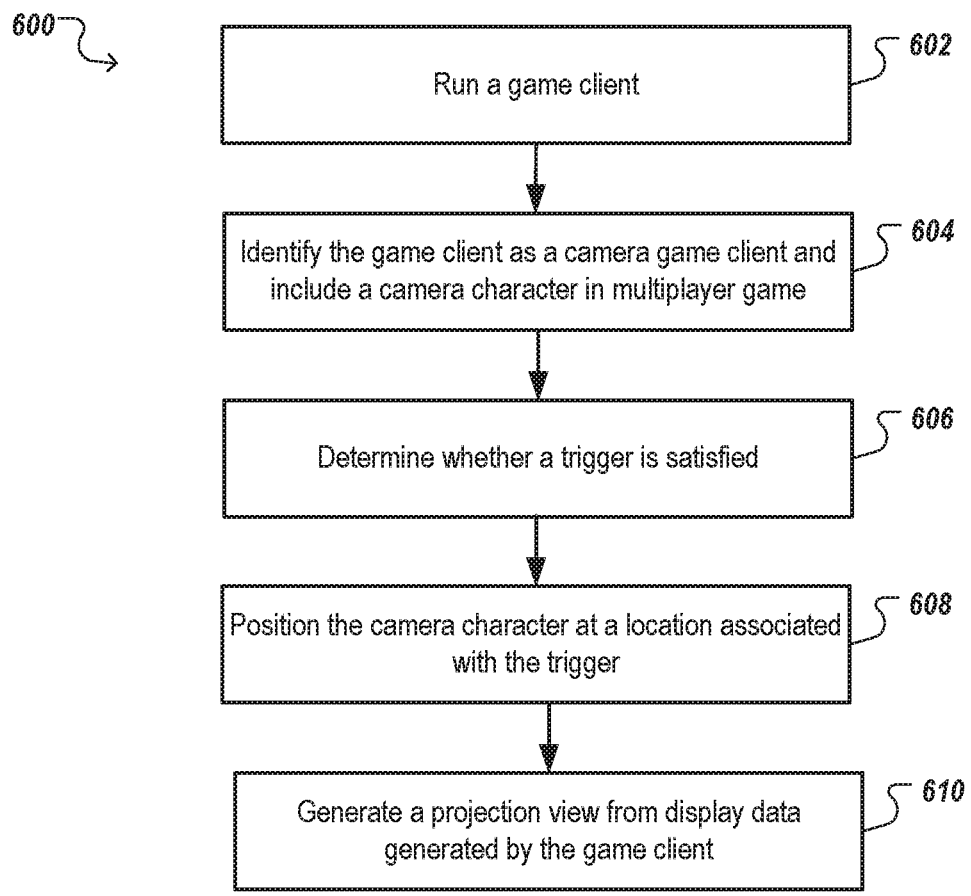
FIG. 6 is a flowchart of an example process for generating a game projection view using a system-controlled game client.

FIG. 6 is a flowchart of an example process for generating a game projection view using a system-controlled game client. For convenience, the process 600 will be described as being performed by a system of one or more computers, e.g., the game control system 102.

To obtain a projection view useful to users engaged in particular games, e.g., first person and third person perspective three-dimensional multiplayer games, the system can include a character controlled by the system in the game. The system can then provide a view as seen by the controlled character as the projection view, effectively designating the controlled character as a camera configured to view game events of interest or use to the users.

The system runs a game client (block 602). The system executes a game client in a virtual machine, e.g., a virtual machine with an operating system that can run the game client, and provides a connection request to the game server.

The system identifies the game client as a camera game client (block 604). The system, e.g., the game server running on the system, receives the connection request from the game client, and identifies the game client as a camera. In some implementations, the game client can provide identifying information, e.g., a particular username, in the request, which the system can use to identify the camera game client.

The system then establishes communications with the game client, and includes a camera character associated with the game client in the multiplayer game. The system can imbue the included camera character with attributes that characters would not otherwise possess. For instance, the camera character can possess the ability to fly in the game world, the ability to teleport to particular locations in the game world, and the ability to be invisible and invulnerable.

The system determines whether a trigger is satisfied (block 606). As described above, with reference to FIG. 5, the system determines whether a trigger is satisfied, and if so, generates a projection view associated with the trigger.

The system positions the camera character at a location associated with the trigger (block 608). After determining that a trigger is satisfied, the system identifies the game events associated with the trigger, and obtains locations of the events in the multiplayer game world, e.g., coordinates identifying locations in the game world.

In some implementations, the system then provides input to the camera game client identifying a position proximate to the obtained locations to place the camera character. In some other implementations, the system, e.g., the game server, updates a position of the camera character. The system can compute the position based on several factors, including a perspective angle of the camera character, e.g., an angle of rotation from a vector passing through a game surface the characters are on; a "fog" distance of the multiplayer game, e.g., a distance each character can view before the multiplayer game reduces the information, e.g., items, other characters, game map, seen in the view; a distance from the game events, and so on.

For instance, for a trigger satisfied by determining that user-controlled characters are engaged in battle, the system can identify locations of each user-controlled character. In some implementations, the system can determine an area that encompasses the user-controlled characters, e.g., a bounded area on a gaming surface the user-characters are located on, and can determine a position outside of the area to place the camera character, e.g., to fit every user-controlled character engaged in battle in the view of the camera character. The system can determine a threshold maximum size of the area, and if the area is greater than a threshold, e.g., too many user-controlled characters are engaged in battle, the system can select a smaller area size to include a subset of the user-controlled characters in the camera character's view. To determine the smaller area size, the system can identify user-controlled characters associated with higher user scores, or higher rankings, positioned in a smaller space, and focus the camera character's view on the higher ranked characters. Other user information, and game events, can be utilizes to focus the camera character's view on a subset of the user-controlled characters.

In some implementations the system can identify, e.g., from stored information, a distance outside of the area to place the camera character. In some other implementations, the system can determine the distance outside of the area based on a distance, e.g., an average distance, that the user-controlled characters are from each other. For instance, if the user-controlled characters are battling with swords, and are in close proximity, the system can identify that the camera character is to be placed in close proximity to the user-controlled characters. Alternatively, if the user-controlled characters are battling with ranged weapons, e.g., rocket launchers, and are thus far apart, the system can determine that the camera character is to be placed in farther proximity to better provide a view of the action. Additionally, the maximum distance to place the camera character can be set by the system as less than the "fog" distance, so that the game events associated with the trigger can remain in full focus and not in the "fog", e.g., with reduced visual acuity and information.

Similarly, the system can determine, or obtain from stored information, a height above the user-controlled characters to place the camera character. In some implementations the height is based on heights of the user-controlled characters, e.g., a user-controlled character can be standing on a ledge, and another user-controlled character can be below. The system can compute the height by computing a distance above the highest user-controlled character. In this way, the system can position the camera character above the action providing a top-down view. In some other implementations, the system can position the camera character at a similar, or lower, height to the user-controlled characters.

The system can then determine a perspective angle of the camera character. That is, the system determines a field of view of the camera character at the determined location and height, described above. Since a three-dimensional multi-player game generally allows for a character to move its head, and thus its view, in three dimensions, the perspective angle identifies an angle about the pitch axis of the character's view, e.g., an angle identifying the character looking up or down. The system determines the field of view to include the user-controlled characters engaged in battle. In some implementations, the perspective angle can be facing down 90 degrees, e.g., from a surface that the user-controlled characters are on, so that the camera character is pointing its gaze directly down onto the game world. In some other implementations, the perspective angle can be facing down between 0 and 90 degrees.

The system then places the camera character at the determined location with the field of view determined from the perspective angle. To place the character, the system provides information identifying the determined location and perspective angle to the camera game client, which teleports, or provides input to move, the camera character to the location.

The above description discussed user characters engaged in battle, however the system can perform a similar analysis for other triggers. For instance, for a trigger satisfied by the occurrence of a particular item, the system can obtain a location of the particular item, and provide information to the camera game client identifying a location and perspective to place the camera character. In some implementations, different triggers can be associated with different methods of determining locations to place the camera character. For instance, if the system determines that a trigger associated with two or more user-controlled characters engaged in battle is satisfied, the system can position the camera character lower to the game surface to view the action close-up. Alternatively, if the system determines that a trigger associated with two or more user-controlled characters approaching, e.g., racing toward, an important item is satisfied, the system can position the camera character higher up, with a perspective angle that makes the camera character look down onto the game surface, e.g., so the projection view makes locations of the user-controlled characters with respect to the important item readily apparent.

Additionally, in some implementations the system can provide information to the camera game client to track a particular user-controlled character, e.g., provide a constant view behind the user-controlled character, or a view looking down on the user-controlled character. The system can determine a user-controlled character to track based on user scores, and/or rankings of the users. Additionally, in some implementations users can pay a fee, e.g., a monetary fee, or non-monetary points accrued by playing multiplayer games, and the system can track the users for a period of time, e.g., 10 seconds, 30 seconds, 1 minute, at the paying user's direction. Furthermore, in some implementations, users can provide information to the system, identifying that they wish to be tracked. For instance, the user can select an option on his/her user device, e.g., the user device can include software in communication with the system.

The system generates a projection view from display data generated by the game client (block 610). After positioning the camera character, the system obtains display data generated by the game client. The display data includes the camera character's field of view, which has been determined to include the game events associated with the satisfied trigger. The display data is then provided for presentation to users playing the multiplayer game.

In some implementations, the system can remove any messages or user related information from the display data, e.g., a health bar of the camera character. Additionally, the camera game client can be modified to not display this information.

Figure 7:
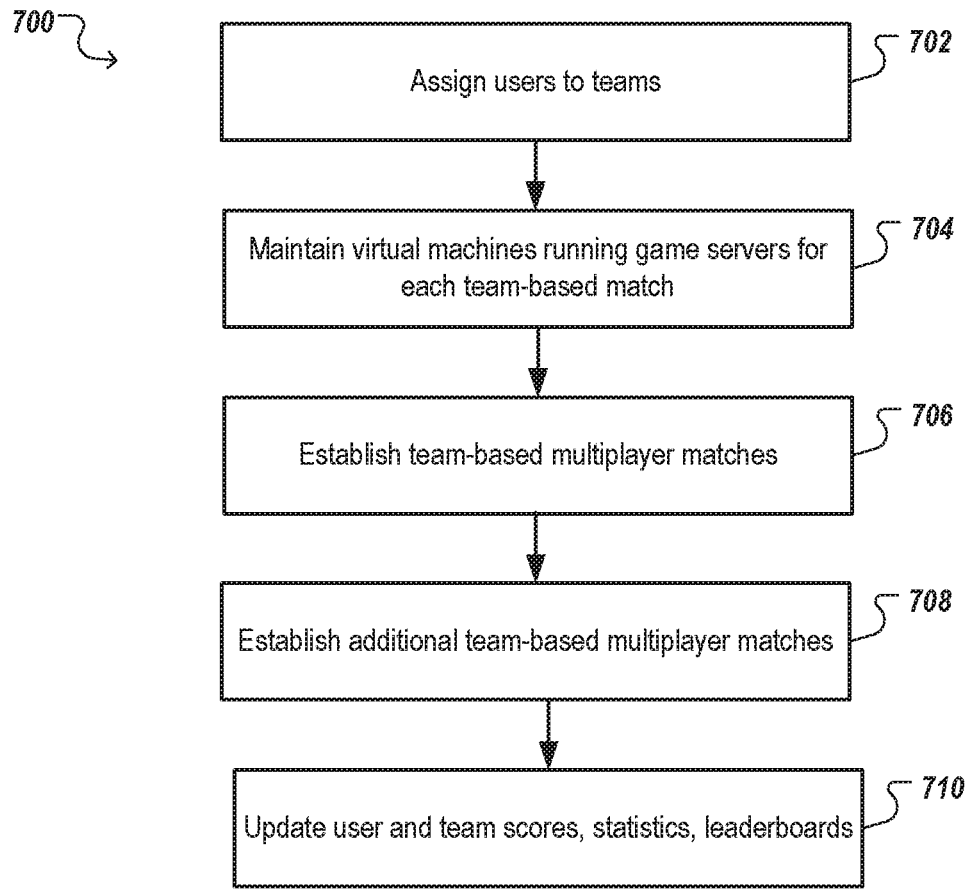
FIG. 7 is a flowchart of an example process for a team-based multiplayer game experience.

FIG. 7 is a flowchart of an example process for a team-based multiplayer game experience. For convenience, the process 700 will be described as being performed by a system of one or more computers, e.g., the game control system 102.

As described above, particular multiplayer games can be team based. That is, users can be members of particular teams, which compete against other teams, until the systems identifies one or more teams as winners of the multiplayer game. As will be described below, the system can run a team-based multiplayer game, automatically creating team-based matches until the system identifies an overall winner.

The system assigns users to teams (block 702). As described above, with reference to step 404 of FIG. 4, the system can obtain user information for each user that will be engaging in the multiplayer game.

In some implementations, each user can identify their respective team membership on a cloud server, e.g., cloud server 330, in communication with the system, e.g., over the Internet. The cloud server can be associated with a front-end system that provides a website configured to receive user login information, e.g., user name, password, associated with the users. The users can provide login information, and input their team information, e.g., team names of teams they are members of. In some implementations, the website can identify multiple established team names, and users can select from among the team names. Additionally, in some implementations, users can input user names of other users they wish to have on their teams. The cloud server can receive the team membership information and store it for later use by the system.

Once the users enter a gaming space, e.g., the movie theater described in FIG. 1, and run game clients associated with the multiplayer game, the system can receive user identifiers from the game clients. The system then obtains team membership information associated with each received user identifier from the cloud server. The system assigns each user to a team based on the team membership information. For users that had not previously identified their team membership, the system can automatically assign the users to teams, e.g., based on keeping team sizes relatively consistent, or based on user scores or leaderboard rankings of the users. Additionally, the users can select teams to join after entering the gaming space, and the system can assign the users to the selected teams.

The system maintains virtual machines running respective game servers for each team-based match (block 704). After assigning users to teams, the system determines a number of initial multiplayer matches based off a number of teams. For instance, if the multiplayer game allows matches to be played by two teams, then the system can determine that the number of multiplayer matches is half the number of teams. Similarly, if there is N number of teams allowed in a multiplayer match, the system can determine that the number of multiplayer matches is the ceiling of the number of teams divided by N.

The system executes and runs a number of virtual machines according to the number of determined initial multiplayer matches. The system runs a game client associated with the multiplayer game in each of the virtual machines, and configures the virtual machines to receive communications with the other virtual machines, and user game clients.

The system establishes team-based multiplayer matches (block 706). The system determines teams that will play each other in a match, e.g., selected randomly, or based off leaderboard rankings of the respective teams, or based off user scores of users in each team.

For each user that will play in a particular multiplayer match, the system establishes communications with the user's game client and a particular virtual machine that will run the particular multiplayer match. In this way, users assigned to each team playing in a particular multiplayer match will be in communication with the same game server running on the same virtual machine.

In some implementations, teams that are determined to play against each other can be physically located in the same space, e.g., the same movie theater room as described in FIG. 1. In some other implementations, each team can be located in a different space. During gameplay, the system generates a projection view for each multiplayer match, and provides the projection view to a display viewable by the users engaged in the multiplayer match. Generating a projection view is described above, with respect to FIG. 5.

Each multiplayer match continues until either the system identifies a winning team, or, optionally, until a game pause trigger is satisfied. A game pause trigger identifies user actions that upon occurrence will cause the system to pause a particular multiplayer match, or all of the multiplayer matches. For instance, a user engaged in a particular multiplayer match can select an option on his/her user device, e.g., in a game client or a separate software or application provided by the system, which identifies that the multiplayer match should be paused. In some implementations, each user is allowed a particular number of pauses, e.g., 1, 2, 3, or each team is allowed a total number of pauses across all users in the team, e.g., 1, 2, 4. Users can utilize these user-directed pauses to discuss game strategy with teammates, or to discuss potential trades or other team-based actions with users of an opposing team.

Additionally, a game pause trigger can identify game events that upon occurrence, will cause the system to pause a particular multiplayer match, or all of the multiplayer matches. For instance, if a team obtains a particular item, moves to a particular location, e.g., another team's territory, or selects an option to barter with the opposing team, the system will pause the multiplayer match.

When a game pause trigger is satisfied, the system can generate a projection view to include useful information to users. For instance, the system can generate a projection view to identify rankings of users in each multiplayer match, or across all multiplayer matches. Additionally, the system can provide information identifying user selection of items, attributes, and other game information as the projection view.

The system establishes additional team-based multiplayer matches (block 708). The system identifies teams that won, or otherwise completed, their respective multiplayer matches, and determines new multiplayer matches pitting the winning teams against each other. Since the number of multiplayer matches will be reduced after the initial multiplayer matches, the system can remove virtual machines determined not to be needed. For instance, if 8 teams played in an initial set of multiplayer matches, with 4 multiplayer matches and 4 virtual machines, the system can identify the 4 winning teams, and determine that 2 multiplayer matches need to be played. The system can then remove the unnecessary 2 virtual machines.

The system continues to establish team-based multiplayer matches until one or more winning teams are ultimately identified.

The system updates user and team scores, statistics, leaderboard rankings (block 710). During gameplay, the game servers track user scores, and other game statistics, which can be associated with each user. After the multiplayer game has completed, the system obtains a final updated version of each user's user score, and other game statistics, e.g., a win rate of each team, and provides the information to the cloud server for storage.

The cloud server determines whether a leaderboard ranking has been modified by the new user scores, and updates the rankings accordingly. For instance, the cloud server can store one or more leaderboards associated with particular multiplayer games, with each leaderboard identifying users, or teams, associated with top rankings of particular multiplayer games. For example, a leaderboard can identify users that have obtained the most of a particular item in a multiplayer game. Another leaderboard can identify users that have caused the most damage to other users in a particular multiplayer game, and so on. Users can then later access the leaderboard rankings.

Additionally, the cloud server can obtain images or video of projection views generated by the system, and store them for later access by users, e.g., after the multiplayer game has completed. In some implementations, users can download an application, e.g., a JAVA application received from the system, or an application downloaded from a smartphone application store, configured to obtain screenshots or video of users' displays. During the multiplayer game, or after the multiplayer game, users can select images or video, generated by their user devices, of their gameplay to provide for storage on the cloud server. Additionally, users can upload images or video of their gameplay to social networks, e.g., with information identifying the multiplayer game, location of the space, and so on. Similarly, the system can provide the projection views to social networks.

The description of FIG. 7 included discussion of pause triggers, updating user information, and providing user gameplay or projection views to social networks or the cloud server. This same discussion can apply in electronic games that are not team-based.

In the description above in FIG. 1-FIG. 7, reference was made to one or more game servers running on the system. Some multiplayer games, e.g., massively multiplayer online role-playing games, run on multiple, e.g., 100, 1000, servers controlled by a publisher or developer of the multiplayer game. Thousands of user-controlled characters can interact in the same game world, with the multiple servers providing game events to each other.

In some implementations, these games can be run locally by the system in a space, e.g., the movie theater described in FIG. 1, without communication with the multiple servers. The system can download the most recent versions of characters controlled by the users at the start of, or prior to, the multiplayer game. The system can then separate the larger game world maintained by the multiple servers, into a game world that only includes users physically located in the space. After the multiplayer game is completed, the system can provide updated user information, e.g., items, user scores, experience points, and so on, to a server associated with the publisher or developer, which can then update the user-controlled characters. In this way, users can engage in local play of the multiplayer game using their characters, receive updates to their characters during the local play, and afterwards continue playing in the larger game world using their updated characters.

The description above identified that the system generates projection views by determining whether one or more triggers are satisfied. In some implementations the system can generate game views without the use of triggers. For instance, the system can provide random views of the game world, e.g., by randomly moving a camera character in the game world.

Blending of Movies with Electronic Games

In some implementations, users can enter a movie theater to watch a particular movie. The users can run a game client on their user devices (e.g., an app downloaded from an application store, or software provided to the user devices upon the system receiving connection requests from the user devices) that is in communication with the system. The system can generate projection views associated with triggers identified for particular scenes in the movie, and generate projection views from game events. For instance, a scene in a movie can involve building a snowman. Users can build a snowman on their respective user devices, and the system can provide representations of one or more of the user built snowmen adjacent to the movie scene.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method for trigger-based generation of projection views, the method comprising:
    receiving communications sent to a game control system from a plurality of user devices playing an electronic game title, the communications from each user device comprising respective game information regarding a respective different view associated with a respective user-controlled character, wherein the respective different view corresponds to a respective display of a game environment at the respective user device;
    executing a game client in a virtual machine of the game control system, wherein the game client executed on the virtual machine is identified as a camera game client establishing a camera character at a first location within the game environment, the camera character controlled by the game control system through the virtual machine, and wherein the game client is executed to provide a view associated with the camera character that includes status data created for the camera character;
    providing a projection view of the first location, the projection view corresponding to the view associated with the camera character at the first location within the game environment, wherein the status data created for the camera character is omitted from the projection view;
    identifying one or more in-game triggers that have been satisfied based on the respective game information of one or more user-controlled characters, wherein the in-game triggers are associated with a different location in the game environment;
    moving the camera character to the different location based on the identified triggers, wherein the moved camera character is associated with a view of the different location; and
    generating an updated projection view of the different location based on the view associated with the camera character at the different location, wherein the updated projection view also omits the status data created for the camera character.

2. The method of claim 1, wherein at least one of the identified triggers is a proximity trigger, and wherein identifying that in-game conditions of the proximity trigger have been satisfied is based on one or more of the user-controlled characters being within a threshold proximity of one or more predetermined items, goals, or locations within the game environment.

3. The method of claim 2, wherein identifying that the in-game conditions of at least one of the identified triggers have been satisfied is further based on a designated importance of the one or more predetermined items, goals, or locations within the game environment.

4. The method of claim 1, wherein the updated projection view is a top-down view of the location in the game environment and further includes the one or more user-controlled characters moving towards one or more predetermined items, goals, or locations within the game environment.

5. The method of claim 1, wherein at least one of the identified triggers is an action trigger, and wherein identifying that in-game conditions of the action trigger has been satisfied is based on identifying that one or more of the user-controlled characters are performing one or more predetermined actions within the game environment.

6. The method of claim 1, wherein at least one of the identified triggers is an aggregation trigger, and wherein identifying that in-game conditions of the aggregation trigger has been satisfied is based on identifying that a first threshold number of the user-controlled characters are within a second threshold proximity of each other within the game environment.

7. The method of claim 1, wherein establishing the camera character imbuing the camera character with one or more predetermined camera character attributes, the attributes including at least one of ability to fly, ability to teleport, invisibility, and invulnerability.

8. The method of claim 1, further comprising:
initiating an instance of the game client, and
identifying an instance as the camera game client, wherein the camera game client is executed to generate projection views of locations in the game environment based on views associated with the camera character and provided by the instance of the game client.

9. The method of claim 8, wherein the instance of the game client is executed to provide a request to identify the instance as the camera game client based on a username identified in the request.

10. The method of claim 1, wherein identifying the in-game triggers further comprises:
comparing a rank of the in-game triggers at the different location with a rank of one or more other in-game triggers at a third location, the rank assigned based on a stored rank order of in-game triggers associated with the electronic game title; and
electing the different location based on determining that the rank of the in-game triggers at the different location is higher than the rank of the other in-game triggers at the third location, wherein moving the camera character to the different location is further based on the election.

11. The method of claim 1, wherein moving the camera character to the different location includes positioning the camera character at the different location based on one or more desired view factors.

12. The method of claim 11, wherein the desired view factors include at least one of perspective angle, field of view, view area size, view height, distance from the user-controlled characters, distance between the user-controlled characters, rank of the user-controlled characters, type of interaction between the user-controlled characters, position height of the user-controlled characters.

13. The method of claim 11, wherein positioning the camera character includes determining a position at the different location, the position associated with a view that meets the desired view factors.

14. A game control system for trigger-based generation of projection views, the game control system comprising:
a communication interface that receives communications sent from a plurality of user devices playing an electronic game title, the communications from each user device comprising respective game information regarding a respective different view associated with a respective user-controlled character, wherein the respective different view corresponds to a respective display of a game environment at the respective user device; and
one or more processors that execute a camera game client to:
execute a game client in a virtual machine, wherein the game client executed on the virtual machine is identified as a camera game client and establishes a camera character at a first location within the game environment, and the camera character controlled through the virtual machine, and wherein the game client is executed to provide a view associated with the camera character that includes status data created for the camera character;
provide a projection view of the first location, the projection view corresponding to the view associated with the camera character of the first location within the game environment, wherein the status data created for the camera character is omitted from the projection view;
identify one or more in-game triggers that have been satisfied based on the respective game information of one or more user-controlled characters, wherein the in-game triggers are associated with a different location in the game environment;
moving the camera character to the different location based on the identified triggers, wherein the moved camera character is associated with a view of the different location; and
generate an updated projection view of the different location based on the view associated with the camera character at the different location, wherein the updated projection view also omits the status data created for the camera character.

15. The game control system of claim 14, wherein at least one of the identified triggers is a proximity trigger, and wherein identifying that in-game conditions of the proximity trigger have been satisfied is based on the one or more user-controlled characters being within a threshold proximity of one or more predetermined items, goals, or locations within the game environment.

16. The game control system of claim 15, wherein identifying that the in-game conditions of at least one of the identified triggers have been satisfied is based on a designated importance of the one or more predetermined items, goals, or locations within the game environment.

17. The game control system of claim 14, wherein at least one of the identified triggers is an action trigger, and wherein identifying that in-game conditions of the action trigger have been satisfied is based on identifying that one or more of the user-controlled characters are performing one or more predetermined actions within the game environment.

18. The game control system of claim 14, wherein at least one of the identified triggers is an aggregation trigger, and wherein identifying that in-game conditions of the-aggregation trigger have been satisfied is based on identifying that a first threshold number of the user-controlled characters are within a second threshold proximity of each other within the game environment.

19. The game control system of claim 14, wherein the camera game client is executable to establish the camera character by imbuing the camera character with one or more predetermined camera character attributes, the attributes including at least one of ability to fly, ability to teleport, invisibility, and invulnerability.

20. The game control system of claim 14, wherein the updated projection view is a top-down view of the location in the game environment and further includes the one or more user-controlled characters moving towards one or more predetermined items, goals, or locations within the game environment.

21. A non-transitory computer-readable storage medium having embodied thereon a program, the program being executable by a processor to perform a method for trigger-based generation of projection views, the method comprising:
receiving communications sent to a game control system from a plurality of user devices playing an electronic game title, the communications from each user device comprising respective game information regarding a respective different view associated with a respective user-controlled character, wherein the respective different view corresponds to a respective display of a game environment at the respective user device;

executing a game client in a virtual machine of the game control system, wherein the game client executed on the virtual machine is identified as a camera game client and establishes a camera character at a first location within the game environment, the camera character controlled by the game control system through the virtual machine, and wherein the game client is executed to provide a view associated with the camera character that includes status data created for the camera character;

providing a projection view of the first location to a display screen, the projection view corresponding to the view associated with the camera character at the first location within the game environment, wherein the status data created for the camera character is omitted from the projection view;

identifying one or more in-game triggers that have been satisfied based on the respective game information of one or more user-controlled characters, wherein the in-game triggers are associated with a different location in the game environment;

moving the camera character to the different location based on the identified triggers, wherein the moved camera character is associated with a view of the different location; and generating an updated projection view of the different location based on the view associated with the camera character at the different location, wherein the updated projection view also omits the status data created for the camera character.

* * * * *